Nov. 27, 1934.   P. FRANK   1,982,509
APPARATUS FOR APPLYING TREATMENT MEDIA TO THE LIVING BODY
Filed Oct. 29, 1931   3 Sheets-Sheet 3
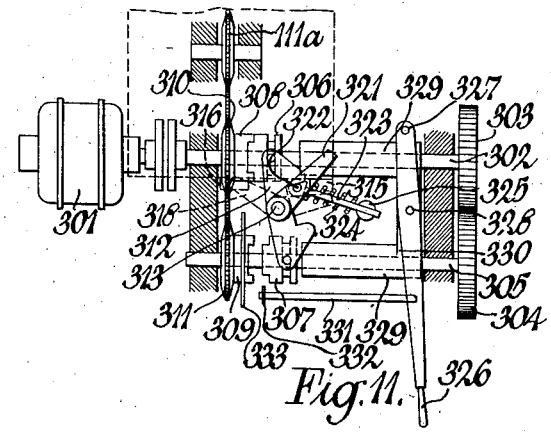
Fig. 11.
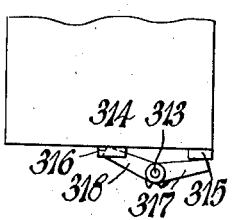
Fig. 13.
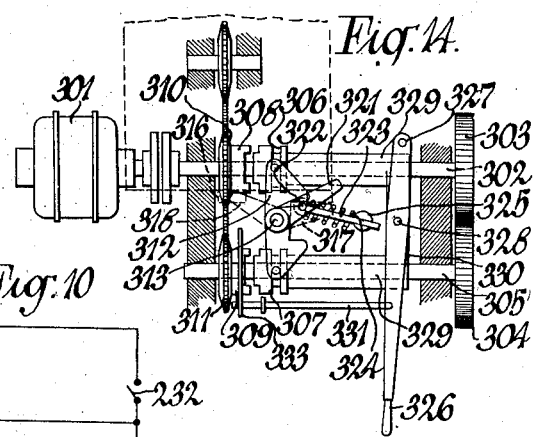
Fig. 14.
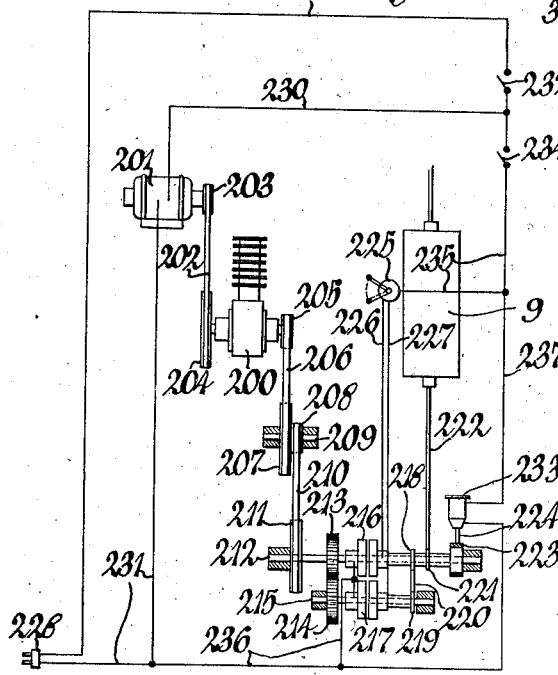
Fig. 10.
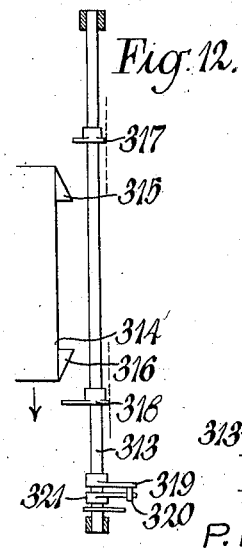
Fig. 12.
Fig. 15.
P. Frank
INVENTOR
By: Marks & Clerk
Attys.

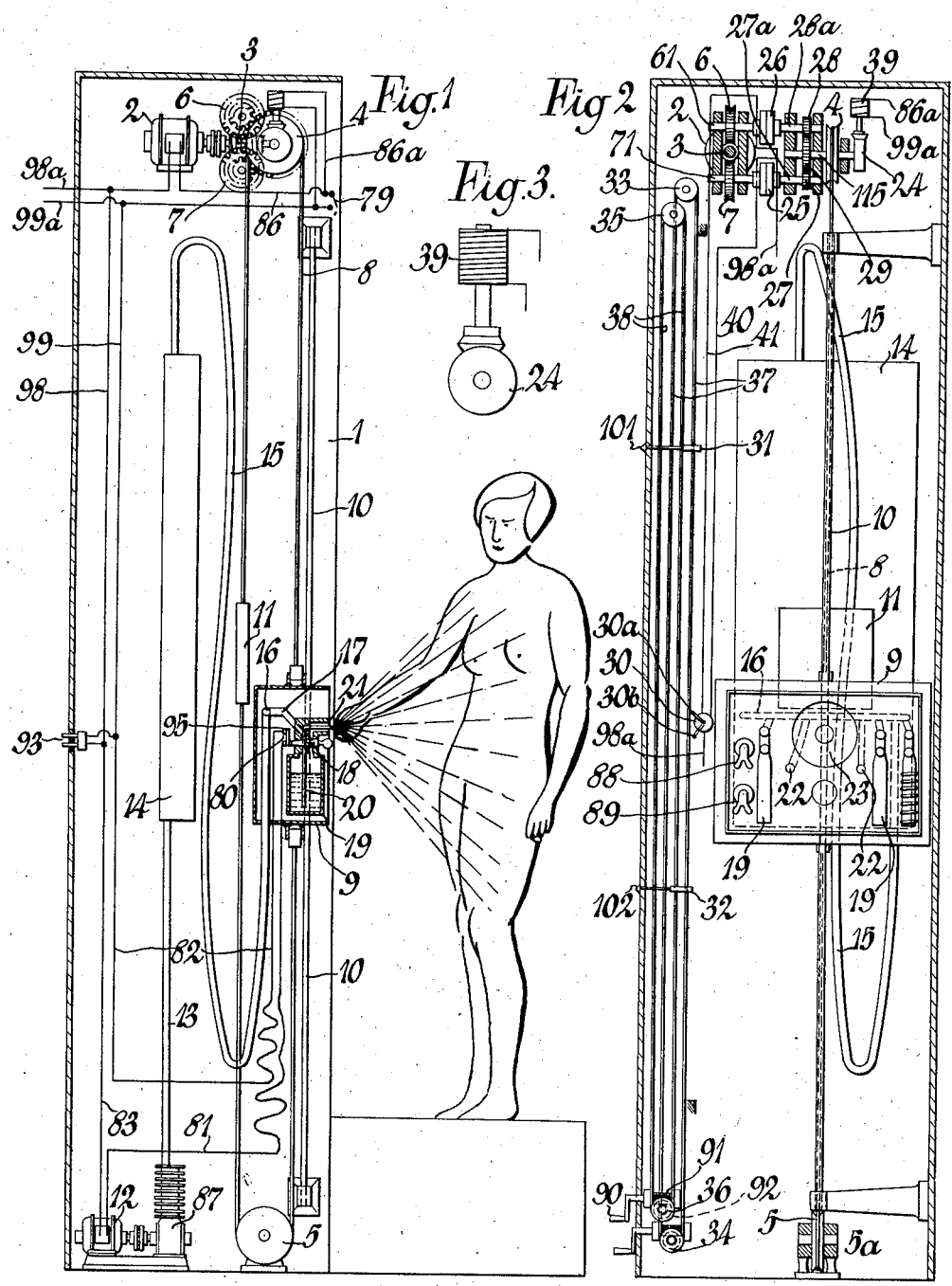

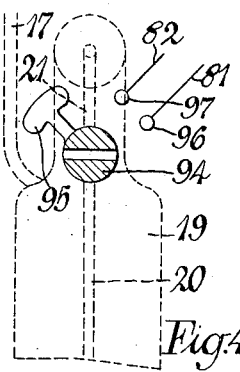
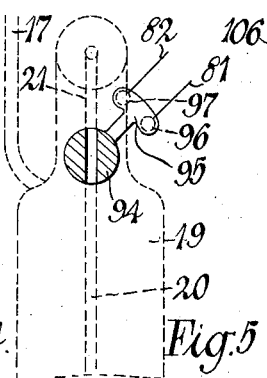
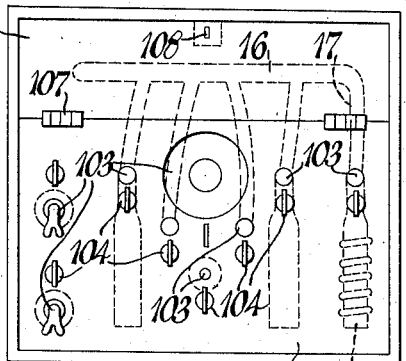
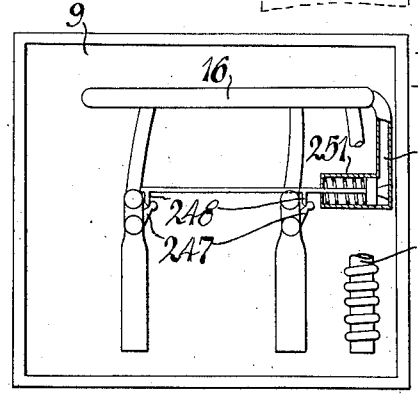
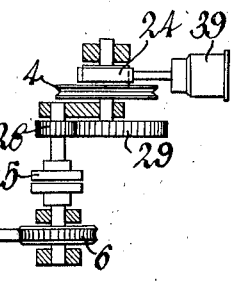
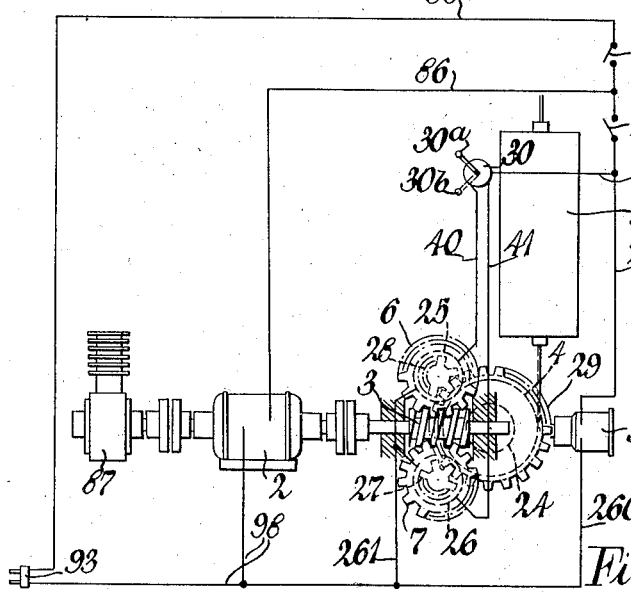

Patented Nov. 27, 1934

1,982,509

UNITED STATES PATENT OFFICE 1,982,509

APPARATUS FOR APPLYING TREATMENT MEDIA TO THE LIVING BODY

Paul Frank, Scheveningen, Netherlands

Application October 29, 1931, Serial No. 571,912
In Switzerland January 10, 1931

9 Claims. (Cl. 128—1)

My invention has for its object to provide an apparatus for treating the living body, substantially at a distance, by which the efficiency and the possibilities for application of in themselves known devices, serving for sanitary, hygienic, medical and/or cosmetic treatments, are increased and enhanced and by which at the same time a continuous and uniform action of one or more of these devices is obtained, without human effort, during any time period, so that the body may be covered with liquid or powder, may have warm or cold fluid blown upon it, may be irradiated electro-therapeutically or treated cold caustically or may be subjected to the action of ozone obtained by high frequency apparatus, e. g. for inhalation purposes, etc. and may also be treated disinfectingly, for cleaning and cosmetically, etc. as required, in an easy manner, without other assistance and at parts which are usually inaccessible or difficultly accessible, while also ordinary inhalation treatment without application of high frequency may be applied.

The invention consists in a balanced or non-balanced device carrier or casing which continuously reciprocates during a certain period, as required, between two reversing points or is stopped and maintained at any spot between two reversing points, said device carrier or casing being provided with known pneumatic and/or electric and/or other devices, driven or fed by the apparatus, if necessary, including the solid, liquid and/or gaseous materials, in such a manner that any external part of the living body to be treated, including the head and limbs, as well as all openings communicating with the atmosphere, may be treated in an easy and hygienic, sanitary manner, electro-therapeutically, medically and/or cosmetically.

Any known pneumatic, electric and/or other devices, serving for the sanitary, hygienic, electro-therapeutic, medical and/or cosmetic treatment of the living body, when required with the matters serving thereto, may be mounted according to the invention in a balanced or non-balanced casing, movable along a fixed guide, which casing is so constructed, that the devices and appurtenances contained therein are protected against damage and theft, when in use as well as out of use, whilst only the distributive parts of the said devices and their actuating means extend beyond the device's casing or may function or be actuated through openings in its walls.

The control of the carrier or casing and the actuation of any device contained in the casing or attached to the carrier may be dependent of each other or otherwise. The motion of the carrier or casing may be vertical as well as horizontal or inclined.

For the sake of simple attending, the whole pneumatic, electric or mechanical apparatus may be driven by one or more electric motors and be connected to an electric supply system.

In order that my invention and the manner of performing the same may be properly understood, I have illustrated a constructional form of the same in the accompanying drawings.

In the drawings:—

Figure 1 shows a side elevation, and

Figure 2 a front elevation of an apparatus with an exclusively vertical motion of the carrier or casing according to the invention.

Figure 3 is a front elevation of a detail.

Figures 4 and 5 are diagrammatical representations of a receptacle for a treatment medium with an electric switch connected to a plug for controlling the supply of said medium in two different positions of the plug and switch.

Figure 6 is a front view of the carrier.

Figure 7 is a sectional elevation of a carrier having means for controlling the plugs of two receptacles for treatment media.

Figure 8 is a top view of an arrangement with one non reversible motor actuating an air-compressor and a reversing mechanism with worm and wormwheels.

Figure 9 is a top plan view of the arrangement shown in Figure 8.

Figure 10 is a diagrammatic view indicating how both air-compressor and carrier can be actuated with belts or chains the reversing mechanism working without worm and wormwheels but with electromagnetic couplings.

Figure 11 is a top view of a purely mechanical reversing mechanism actuated by a non reversible motor.

Figure 12 is a front view of the carrier and the vertical shaft, controlling the mechanical reversing mechanism.

Figure 13 is a top view of the carrier and the vertical shaft.

Figure 14 is a top view of a purely mechanical reversing mechanism in disengaged position.

Figure 15 is a top view of the lever 319 from the drawing of Figure 12.

Referring to Figures 1 and 2 of the drawings, 1 indicates a housing in the upper part of which an electric motor 2 with driving worm 3 is mounted. The said electric motor, which is adapted to rotate in one direction only, is supplied with current by conductors 98, 99 from a suitable source of supply.

The said worm 3 meshes with the worm wheels 6 and 7, the latter being fixed on shafts 61, 71 having electromagnetic clutches 25 and 26 respectively thereon for coupling up the shafts to shafts 27a, 28a with gear wheels 27 and 28 fixed thereon. These gear wheels 27 and 28 mesh with a toothed gear 29 fixed on a shaft 115, a pulley 4 fixed upon the same shaft so as to enable the pulley to be slowly rotated by the motor. Upon the shaft 115 of the pulley 4 a brake disc 24 is keyed, which co-operates with an electric brake 39. A cable or chain 8 passes round the pulley 4 and a pulley 5 on a shaft 5a mounted in the lower part of the housing 1, the treatment device carrier or casing 9 being suspended from this cable or chain 8. A reversing switch 30 is mounted upon this carrier or casing 9 and is provided with a reversing lever adapted to be brought into the positions 30a or 30b (Fig. 2) and which will be more fully described hereinafter.

In the lower part of the housing 1 is also mounted an electric motor 12 driving an air compressor 87, connected by a delivery tube 13 to an air vessel 14, in its turn connected by a flexible tube 15 to a collecting tube 16, from which branch tubes 17 leading to cocks 18 of treatment vessels 19. The plugs of each of these cocks 18 are provided with two bores in order to enable the compressed air to press liquids or other materials such as salves or powder contained in the vessels 19 through tubes 20 into the atomizer 21, where they will be mixed with compressed air and atomized into the atmosphere and against the body A to be treated. By means of these plugs any atomizer 21 may be separately brought into action. In the drawing only two vessels 19 are shown, but it is evident that any other number of vessels 19 may be used.

The compressed air from the compressor 87 may also be passed directly into the atmosphere through openings 22 at normal temperature or after being heated by a device not shown in the drawings. The atomizers may comprise inhalation devices or other hygienic, medical and/or cosmetic devices which will hereinafter be referred to by the collective term "devices".

Electric treatment devices, such as outfits for artificial sun 23 and other devices for treating the body, supplied with electric current, may also be housed in the carrier but these treatment devices however, do not themselves form part of the invention.

The carrier or casing 9 is reciprocated by the cable or chain 8, along a fixed guide-rod 10, whilst the weight of the complete carrier is balanced by a counterweight 11.

The reversing switch 30 comprises two contacts (not shown) connected by two electric conductors 40 and 41, respectively with one end of the windings of the electromagnetic clutches 25 and 26 and a switch lever connected by a conductor 98a to the conductor 98, the other ends of the said windings being connected by a conductor 99a to the conductor 99. In the position 30a of the switch lever, the one coupling is excited and in the position 30b, the other coupling is excited. The adjustment of this switch lever is effected during the motion of the carrier 9 when the switch lever abuts against one of the reversing studs 31 and 32, connected to the position indicators 101 and 102 respectively. These studs 31 and 32 are fixed to endless chains or cables 37, 38 respectively, passing round pulleys 33, 34 and 35, 36 respectively. They are adapted to be adjusted and locked at any height, by actuating the cranks 90 fixed upon the same shafts as the worms 91 engaging the worm wheels 92, fixed upon the same shafts as the pulleys 34 and 36 respectively.

The apparatus may be connected to the electric supply system by means of a plug-contact 93.

The supply of current to the electric motor 12 for actuating the compressor 87 takes place by means of conductors 83, 81, the switch 80 and the conductor 82. The conductors 81 and 82 are in part constructed as flexible conductors, as the switch 80 is mounted in or upon the movable carrier 9. This switch, 80, may be actuated by hand or foot.

Fig. 4 shows diagrammatically a receptacle for a treatment medium with the plug 94 of the cock 18 and the sliding contact 95 of the switch 80 connected to the plug, said contact being free from the contacts 96 and 97, which are connected to the conductors 81 and 82 respectively of Figure 1.

Figure 5 is a similar view to that shown in Fig. 4 but with the plug 94 of the cock 18 in the open position, the sliding contact 95 connecting the two contacts 96 and 97 in which position of the plug 18 the electric motor 12 of Figure 1 is excited, the air compressor is put into action and drives the treatment device, the plug 94 of which is in the open position, by air pressure.

By opening by hand or foot a switch 79 placed between the electric conductors 86 and 99 of the driving motor 2 of Figures 1 and 2, the electric motor 2 may be stopped at any moment so that the carrier or casing 9 may be stopped at any height to which it has been moved. By cutting off the current supply to the motor 2, the electromagnetic couplings 25 and 26 are rendered currentless, as well as the coil of the electric brake 39, which is supplied with current by a conductor 86a connected to the conductor 86 and a conductor 99a connected to the conductor 99, the brake then acting to hold the disc 24 and stop the motion of the pulley 4 and the carrier or casing 9. The electric motor 12 and its compressor 87 are independent of the current supply to the electric motor 2, the electromagnetic couplings 25 and 26 and the brake 39.

In Figure 6 is diagrammatically shown a front elevation of the treatment device casing 9, indicating openings in the front wall 105 of the casing 9, through which openings the treatment devices contained in the casing function. At 104 are indicated the actuating handles of the cocks 18 extending beyond the wall 105. 106 indicates a part of the front wall connected by means of hinges 107 to the fixed part 105 and provided with a locking device 108.

This hinged part of the front wall, in the open position, gives access to the inner part of the casing 9. By the construction of the carrier described, the treatment devices will be secured against damage and theft, both when the apparatus is in use and when it is out of use, while only the distributive parts of the said devices necessary for the treatment, and the controlling means for their actuating means, extend beyond the carrier or casing, or may be caused to function, or may be actuated through openings therein.

The apparatus according to Figures 1 to 3 operates as follows:—

It is assumed that the treatment device carrier or casing 9 has the position indicated in the drawings and is locked in this position by the action of the electric brake 39 on the brake disc 24, whilst the driving gear of the carrier or casing 9 is out of operation.

If the carrier or casing 9 is to be started, the circuit of the motor 2 is closed by means of the switch 79, so that the motor starts. At the same time the electric brake 39 is excited, releasing the brake disc 24 and also, dependent of the position of the switch lever of the reversing switch 30, one of the electro-magnetic couplings 25 or 26 is excited.

The electro-motor 2 will then rotate the worm 3 and the two worm gears 6 and 7 (in opposite directions) and the left hand parts of the electro-magnetic couplings 25 and 26. One or other of these couplings is excited according to the position of the lever of the switch 30 and will communicate its motion to the toothed gear 29 and the pulley 4, which by means of the cable or chain 8 reciprocates the device carrier or casing 9. As soon as the lever of the reversing switch 30 engages one of the reversing studs 31 or 32, this lever will be turned over, so that the excited electro-magnetic coupling is rendered currentless, whilst the other coupling, previously unexcited is now excited. In consequence the direction of rotation of the toothed wheel 29 and the pulley 4 is reversed and the carrier or casing 9 moves in the opposite direction until the lever of the reversing switch 30 engages the opposite reversing stud, so that in a corresponding manner to that just described, the motion of the carrier or casing 9 is again reversed. The electromotor 2, the worm 3, worm gears 6 and 7 and the adjacent parts of the electro-magnetic couplings 25 and 26 rotate continuously in the same direction, also during the reversal of the motion of the carrier or casing 9.

The points between the reciprocation of the carrier or casing 9 is required, depend on the position occupied by the reversing studs 31 and 32. These studs may be adjusted by actuating the cranks 90, whereby the worms 91, the worm wheels 92 and pulleys 34 and 36 are rotated and the reversing studs 31 and 32 displaced. The position of these studs is indicated by the indicating devices 101 and 102.

By a corresponding displacement of the reversing studs 31 and 32 it is possible to treat the body, as required, over the whole length thereof or over any desired portion thereof.

By a corresponding movement and position of the head, body and/or members, the treatment may be applied to any part of the body, also the head and/or limbs. If the part to be treated is small it is unnecessary to reciprocate the carrier and the latter may be maintained in a determined position by cutting off at the exact moment the current supply to the electro-motor 2 and therefore at the same time to the excited electro-magnetic coupling 25 or 26 and the electric brake 39 by means of the switch 79.

While the brake disc 24 and the pulley 4, cable or chain 8 and the carrier or casing 9 are immediately stopped, the rotor of the electromotor 2 and the worm 3, fixed to it, the worm gears 6 and 7 and the parts of the electro-magnetic couplings 25 and 26, fixed to the same, are disconnected from the mechanism braked by the brake 39 and will rotate idly until their kinetic energy is spent. By this provision, when stopping the carrier or casing 9, the necessity of stopping the rotor of the motor 2 in a very short time is avoided, which could only be obtainable by imposing a heavy load and much wear on different parts.

The weight of the carrier of casing 9 and the devices contained in it or attached to it may be partly or wholly balanced by the counterweight 11.

The treating devices contained in or attached to the casing or carrier 9 may be of a different kind, with respect to their operation as well as to their driving or excitation. Those which are exclusively supplied with electric current, e. g. acting with high frequency electricity, receive their supply in a simple manner, not shown in the drawings, from the current supply plug 93. The devices, acting with compressed air, e. g., for the atomizing of powder or of liquid, get their compressed air from the air compressor 87, driven by the electro-motor 12 and delivering the air through the tube 13, air vessel 14 and the flexible tube 15 to the connecting tube 16 in the carrier or casing 9, and from this tube 16 through the branch tubes 17 to the different devices. The electro-motor 12 may be controlled by the switch 80, which switch may be actuated either separately or simultaneously with one of the controlling means of these devices.

If one or more of the vessels 19 are intended to contain an expensive and volatile liquid or other treatment medium, it is desirable to prevent the escape of the contents by evaporation or otherwise, when the apparatus is not in use. For this purpose, the plugs or one or more of the cocks 18 are provided with means for automatically moving them into the closed position on the treatment being discontinued. Referring to Figure 7 a lever 247 is attached to each of the plugs 94, in the case illustrated two of the plugs being so fitted, said levers being arranged so as to lie in the path of dogs 248 fast on a sliding rod 249, on the right hand end of which a piston 250 is fixed which reciprocates in a cylinder 251. The right-hand end of the cylinder 251 is in open communication with the air reservoir 14 by means of a pipe 253 so that the piston 250 is urged to the left by the pressure existing in the air reservoir against the force of a helical spring 252, one end of which bears against the left hand side of the piston and the other end against a shoulder 256 on the left hand end of the cylinder, an abutment 254 being provided on the right hand end wall of the cylinder to prevent the piston from closing the end of the pipe 253. In the position shown in Figure 7, the levers 247 hold the plugs in the closed position, the spring 252 holding the rod 249 to the right, the pressure in the reservoir 14 being insufficient to overcome the force of the spring. For the purpose of enabling the compressed air to escape from the reservoir 14 on the electro-motor 12 and air compressor 87 being stopped, a small aperture 255 is provided in the piston 250 so as to provide open communication between the pipe 253 and the outside air. Thus, as long as the motor 12 remains currentless and the compressor 87 is out of action, the dogs 248 will hold the levers 247 in the position shown but as soon as the pressure in the air reservoir 14 has been raised by the operation of the compressor to the desired degree, the piston 255 is moved to the left and the dogs 248 will be moved clear of the levers 247, thereby enabling one or more of the plugs 94 to be moved into the open position by hand if required. The size of the opening 255 is insufficient to produce any appreciable reduction of pressure in the reservoir 14 while the compressor is in operation.

If, after the treatment has been terminated, one or more of the plugs 94 has been left in the open position, the spring 252 will force the piston 250 to the right as soon as sufficient quantity of air has leaked through the opening 255 and the dogs 248 will rotate the levers 247 clockwise, thereby automatically moving the plugs 94 into the closed position.

It will be obvious that when a number of the units shown in Figures 1 and 2 are installed, only a single motor 12 and compressor 87 may be provided for supplying compressed air to all the units, the air for each unit being drawn from a common air reservoir, preferably provided with means for shutting off the current on the motor 12 on the pressure attaining a predetermined value, such as an arrangement similar to Figure 7, but in which a dog 248 is arranged to open the motor circuit on the pressure overcoming the force of the spring 252 and the piston 250 is not provided with an aperture 255.

It will also be obvious that the various units of a battery or even a single unit may receive compressed air from a compressed air main if such is available instead of from a motor-driven compressor.

Where a plurality of units receive compressed air from a common source of supply, the pipe 253 will be arranged to communicate with the connecting tube 16 and a valve for shutting off the air supply thereto.

In the embodiment of the invention shown in Figs. 8 and 9, the air compressor 87 is driven by the non-reversible electro-motor 2 which also drives the worm 3 meshing with the worm wheels 6 and 7 which may be operatively connected up to the toothed wheels 27, 28 by means of electromagnetic couplings 25, 26 respectively. The toothed wheels 27, 28 mesh with a toothed wheel 29, on the shaft of which is fixed the pulley 4 over which a flexible supporting member for the treatment device carrier runs as before. The other parts of the embodiment shown in Figs. 8 and 9 are constructed and operate in the same manner as the parts bearing the corresponding reference numbers in Figs. 1 and 2.

In the embodiment shown in Fig. 10, the air compressor 200 is driven from a non-reversible electric motor 201 by a belt or chain 202 running over the wheels 203 and 204. On the shaft of the air compressor 200 is fixed a wheel 205 over which runs a belt or chain 206 actuating a wheel 207 coupled to a wheel 208. Both wheels are fixed upon an intermediate shaft 209, a belt or chain 210 transmitting the rotation of shaft 209 to a wheel 211 fixed on a shaft 212. On the shaft 212 is also fixed a tooth wheel 213 meshing with a tooth wheel 214 fixed on a shaft 215, which therefore always rotates in the opposite direction to that of the shaft 212. On the shafts 212 and 215 are mounted parts of two couplings 216 and 217 by which tooth wheels 218 and 219, which rotate freely around the shafts 212 and 215, can respectively be rotated in the corresponding directions of rotation of the shafts 212 and 215 when the corresponding coupling 216 or 217 is engaged. An endless chain 220 running over tooth wheels 218 and 219 causes these two wheels to run always in the direction corresponding to that of the shaft 212 or 215. For instance, when the coupling 216 is engaged and the coupling 217 is disengaged, the direction of rotation of the tooth wheels 218 and 219 will correspond with the direction of rotation of shaft 212. If however the coupling 216 be disengaged and the coupling 217 engaged, the direction of rotation of the tooth wheels 218 and 219 will correspond with the direction of rotation of shaft 215, which is opposite to the direction of rotation of shaft 212. Connected with the tooth wheel 216 is a wheel 221 over which runs a chain or belt 222 fixed to the carrier 9 of Fig. 1 and by means of which the carrier can be reciprocated. To the tooth wheel 222 may be connected a brake wheel 223 upon which acts a brake 224 that enables the carrier to be kept stationary in any desired position into which it has previously been moved, after disengaging both of the couplings 216 and 217. These couplings may be electromagnetic couplings operated as hereinbefore described, but they may also be mechanically operated couplings. When electro-magnetic couplings are used, the controlling thereof may be effected by an electric switch 225 operated during the reciprocation of the carrier by stationary but adjustable trip devices as hereinbefore described with reference to Figs. 1 and 2, 226 and 227 being the electric conductors connecting the switch 225 to the couplings 216 and 217. The supply of electric current may be effected by a switch 228 connected to any electric supply system. The supply of current to the electric motor 201 may be effected by conductors 229, 230 and 231 and a switch 232. The brake 224 may be controlled by an electromagnet 233 which, when energized, puts the brake out of action and when deenergized, enables the brake to act. The supply of electric current to the couplings 216 and 217 may be effected by a conductor 229, switches 232 and 234, conductor 235, the switch 225 and conductors 226, 227 and 236. The supply of electric current to the brake magnet 233 is effected by conductors 237 and 238.

The air compressor 200 could obviously, if desired, be driven from the motor 201 independently of the rest of the mechanism described.

A further example of construction is shown schematically in the Figures 11, 12, 13, 14 and 15. In this construction neither worm and wormwheels nor electromagnetic couplings are used, all of the reversing means are mechanical ones.

The non-reversible electric motor 301 which also actuates the air-compressor, which is not shown in the drawings, drives the shaft 302. Fixed on the shaft is the tooth wheel 303 meshing with the tooth wheel 304 fixed on the shaft 305. As the motor 301 runs always in one direction, the sense of rotation of the shafts 302 and 305 will be opposite. Rotating with these shafts are the coupling-halves 306 and 307 which can slide over the shafts 302 and 305, but which rotate always with these shafts. The coupling-halves 308 and 309 are so arranged that they can rotate freely on the shafts 302 and 305 but cannot slide along them. Fixed to these coupling-halves are the sprocket wheels 310 and 311, over which runs a chain which is passed over upper and lower sprocket wheels, only the lower one 111a being shown, said chain operating the carrier 9. The controlling of the coupling-halves is effected by a coupling-link 312 which may oscillate round the shaft 313, so that when one of the couplings 306—308 or 307—309 is engaged the other one is disengaged, thus transmitting to the carrier the movement in one or other direction.

The controlling of the coupling-halves 306 and 307 is effected by the carrier as shown in Fig. 12, 314 being the carrier provided with reversing members 315 and 316 which on the chosen reversing points coact with the reversing levers 307 and 318, which are adjustable at the desired heights. One of these reversing levers 317 and 318 is adapted to turn the shaft 313 through a certain angle in one direction, the other one to turn the shaft through a certain angle in the opposite direction. Fixed on the shaft 313 is a lever 319 provided with two pins 320 as shown in Fig. 15. Between these two pins is a certain space, larger than the breadth of the lever 321 which can rotate freely on the shafts 313. This lever 321 is provided with a pin 322 round which rotates a pin 323, provided with an aperture. Round this pin is a coiled spring 324, resting against the fixed part 325 and always pushing the pin 323 in one of its extreme positions the pin 322 pushing against the lever 312.

The Fig. 11 indicates the position in which the coupling 308 is actuated, the lever 312 rocked into its position by pressure of the spring 324. As soon as the carrier arrives at its next reversing point the shaft 313 is turned through a certain angle in clockwise direction. The lever 319 (Fig. 15) is also turned in the same direction. One of the pins 320 will push against the lever 321 which is also turned in clockwise direction, compressing the coiled spring 324. The lever 312 however remains stationary until the lever 321 has passed its central position, in which the spring is compressed to its maximum extent. When lever 321 is turned a little more, the spring 324 will suddenly push this lever into its other extreme position, during which movement the pin 322 will coact with the lower part of lever 312 causing it to turn a certain angle round shaft 313 thus first disengaging coupling 306—308 and engaging coupling 307—309.

When the carrier reaches its opposite reversing position the lever 312 is again actuated in the other direction, disengaging coupling 307—309 and again engaging 306—308. As it may be necessary to keep the carrier stationary whilst the motor 301 continues to run for instance to actuate the air-compressor, both of the couplings 306—308 and 307—309 must be disengaged. This may be effected by the handle 326 provided with a fulcrum 327 and a pin 328 acting on two sliding pieces 329 which are connected by the part 330.

In the position shown in Fig. 11 both of the sliding pieces 329 are free from the coupling halves 306 and 307. In the position shown in Fig. 14 however, the handle 326 is drawn to the left and in consequence the two sliding pieces 329 also pushed to the left pushing the two coupling halves 306 and 307 in their centre position in which they are free from the coupling halves 308 and 309, thus no moving energy being transmitted from the shafts 302 and 305 to the tooth wheels 310 and 311.

In order to keep the disconnected carrier fixed in its position the lever 326 also operates a rod 331 sliding through a guide 332 and which in the position shown in Fig. 11 is free from the disc 333 fixed to the coupling half 309 provided with a number of holes. In the position shown in Fig. 14 however, the rod 331 is pushed through one of the holes of the disc 333, preventing the rotation of 309 and so keeping the carrier stationary.

In Fig. 13 the carrier 314 is shown in top plan view, 315 and 316 being the reversing members acting respectively on the levers 317 and 318 fixed on the shaft 313.

It is to be understood that my invention is not restricted to the particular embodiments described and illustrated.

What I claim is:—

1. Apparatus for applying treatment media to a living body, comprising a carrier, a source of treatment medium wholly supported on said carrier, automatic reversible drive means for said carrier for moving the carrier to and fro to apply the treatment medium to various parts of the body and means connected to said source of treatment medium for supplying energy thereto from a source of power for applying the medium to the body.

2. Apparatus for applying treatment media to a living body, comprising a carrier, projecting means and a source of treatment medium capable of being ejected through said projecting means wholly supported on said carrier, automatic reversible drive means for said carrier for moving the carrier to and fro to apply the treatment medium to various parts of the body and a source of fluid pressure connected to the source of treatment medium for applying the medium to the body through said projecting means.

3. Apparatus for applying treatment media to a living body, comprising a carrier, a plurality of sources of treatment media wholly supported on said carrier, automatic reversible drive means for said carrier for moving the carrier to and fro to apply the treatment medium to various parts of the body, and means connected to the several sources of treatment media and selectively operable for connecting the sources of treatment media to a source of power for applying the treatment media to the body.

4. Apparatus for applying treatment media to a living body comprising a carrier, a plurality of sources of treatment media wholly supported on said carrier, automatic reversible drive means for said carrier for moving the latter to and fro to apply the treatment media to various parts of the body, and means for selectively controlling the emission of the treatment media from the various sources.

5. Apparatus for applying treatment media to a living body comprising a carrier, a plurality of sources of treatment media wholly supported on said carrier, automatic reversible drive means for said carrier for moving the latter to and fro to apply the treatment media to various parts of the body, means for controlling the emission of treatment media from the several sources, and means for simultaneously actuating the several control means.

6. Apparatus for applying treatment media to a living body comprising a carrier, a plurality of sources of treatment media wholly supported on said carrier, automatic reversible drive means for said carrier for moving the latter to and fro to apply the treatment media to various parts of the body, and means for selectively controlling the emission of the treatment media from the various sources whereby during the movement of the carrier in either direction the emission of treatment media from the several sources may be controlled in predetermined sequence.

7. Apparatus for applying treatment media to a living body comprising a carrier, a plurality of sources of treatment media wholly supported on said carrier, automatic reversible drive means for said carrier for moving the latter to and fro to apply the treatment media to various parts of the body, and means for selectively controlling the emission of the treatment media from the various sources whereby during the movement of the carrier in either direction the emission of treatment media from the several sources may be controlled in predetermined sequence, or the emission of treatment media from a selected group of the sources may all be effected simultaneously.

8. An apparatus as claimed in claim 2, characterized by the provision of a valve controlling the discharge of treatment medium from said source of treatment medium, and means actuated by said valve for controlling the source of fluid pressure.

9. An apparatus as claimed in claim 2 characterized by the provision of a valve controlling the discharge of treatment medium from said source of treatment medium, and means controlled by said source of fluid pressure to move the valve to closed position when the pressure of the pressure fluid falls to a predetermined value.

PAUL FRANK.